United States Patent
Hagerman et al.

(10) Patent No.: US 12,486,893 B2
(45) Date of Patent: Dec. 2, 2025

(54) LUBRICATION ARRANGEMENT FOR A HOLLOW SHAFT IN A TRANSMISSION SYSTEM OF A VEHICLE

(71) Applicant: VOLVO TRUCK CORPORATION, Gothenburg (SE)

(72) Inventors: Henrik Hagerman, Gothenburg (SE); Rishab Ravindran Rao, Gothenburg (SE); Cornelia Wong Nylander, Gothenburg (SE); Rabi Bethdavid, Hisings Backa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/918,592

(22) Filed: Oct. 17, 2024

(65) Prior Publication Data
US 2025/0137526 A1    May 1, 2025

(30) Foreign Application Priority Data
Oct. 30, 2023   (EP) ..................................... 23207032

(51) Int. Cl.
*F16H 57/04* (2010.01)
*F16H 63/30* (2006.01)

(52) U.S. Cl.
CPC ....... *F16H 57/043* (2013.01); *F16H 57/0471* (2013.01); *F16H 63/3026* (2013.01)

(58) Field of Classification Search
CPC ............... F16H 57/043; F16H 57/0426; F16H 57/0428; F16H 57/0473
See application file for complete search history.

(56) References Cited

U.S. PATENT DOCUMENTS 5,341,901 A    8/1994   Mueller et al.

FOREIGN PATENT DOCUMENTS

| CN | 1381683 A | 11/2002 | |
|---|---|---|---|
| DE | 102014111461 A1 | 2/2016 | |
| FR | 2740853 A1 * | 5/1997 | ............... F16N 7/18 |
| GB | 2153924 A | 8/1985 | |
| TW | 531611 B | 5/2003 | |

OTHER PUBLICATIONS

Extended European Search Report in corresponding European Application No. 23207032.6 dated Mar. 25, 2024 (9 pages).

* cited by examiner

*Primary Examiner* — Huan Le
(74) *Attorney, Agent, or Firm* — Venable LLP; Jeffri A. Kaminski

(57) ABSTRACT

A lubrication arrangement directs lubricant into an axial bore of a shaft rotating in a rotational direction around a rotational axis in a transmission system of a vehicle. The lubrication arrangement has a cup-shaped housing having an axially directed inner surface facing an end of the shaft and a radially directed inner surface facing a radially directed outer surface of the shaft; and a lubricant guide arranged between the axially directed inner surface of the housing and the end of the shaft and configured to guide lubricant impinging on the lubricant guide into the axial bore at the end of the shaft. The radially directed inner surface of the housing has a flow redirecting structure configured to guide lubricant impinging in a radial direction on the flow redirecting structure axially towards the lubricant guide.

14 Claims, 4 Drawing Sheets

LUBRICATION ARRANGEMENT FOR A HOLLOW SHAFT IN A TRANSMISSION SYSTEM OF A VEHICLE

TECHNICAL FIELD

The disclosure relates generally to lubrication. In particular aspects, the disclosure relates to a lubrication arrangement for a hollow shaft in a transmission system of a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In a mechanical system with rotating shaft, it is challenging to provide lubricant to all lubrication sites. It may be particularly challenging to guide lubricant into an axial bore of a rotating shaft, such as a countershaft of a countershaft brake in a transmission system. It would therefore be desirable to provide for improved transportation of lubricant into an axial bore of a rotating shaft.

SUMMARY

According to a first aspect of the disclosure, there is provided a lubrication arrangement for directing lubricant into an axial bore of a shaft rotating in a rotational direction around a rotational axis in a transmission system of a vehicle, the lubrication arrangement comprising: a cup-shaped housing having an axially directed inner surface facing an end of the shaft and a radially directed inner surface facing a radially directed outer surface of the shaft; and a lubricant guide arranged between the axially directed inner surface of the housing and the end of the shaft and configured to guide lubricant impinging on the lubricant guide into the axial bore at the end of the shaft, the radially directed inner surface of the housing having a flow redirecting structure configured to guide lubricant impinging in a radial direction on the flow redirecting structure axially towards the lubricant guide. The first aspect of the disclosure may seek to solve the problem of insufficient supply of lubricant to the axial bore of a rotating shaft. A technical benefit may include to provide a simple and compact way of guiding lubricant into the axial bore of the rotating shaft.

Optionally in some examples, including in at least one preferred example, the flow redirecting structure may comprise at least one fluid guiding structure extending in a direction having a component in the rotational direction of the shaft and an axially directed component. A technical benefit may include to guide lubricant that has been thrown away from an outer radial surface of the shaft efficiently towards the lubricant guide, to be guided thereby into the axial bore of the shaft.

Optionally in some examples, including in at least one preferred example, the flow redirecting structure may comprise a plurality of substantially parallel fluid guiding structures, such as grooves and/or ridges. A technical benefit may include to provide efficient guidance for the lubricant.

Optionally in some examples, including in at least one preferred example, the fluid guiding structures may be substantially evenly distributed across at least a portion of the radially directed inner surface of the housing. A technical benefit may include to provide even more efficient guidance for the lubricant.

Optionally in some examples, including in at least one preferred example, the lubricant guide may comprise an axially directed lubricant-receiving surface facing the end of the shaft and at least one redirecting structure extending into the axial bore of the shaft. A technical benefit may include to stop the axial movement of the lubricant using the lubricant-receiving surface, so that the lubricant starts to move vertically downwards, and redirect the vertically downwards moving lubricant into the axial bore of the shaft using the at least one redirecting structure.

Optionally in some examples, including in at least one preferred example, the least one redirecting structure may be formed by a partly cut out and bent portion of the lubricant guide. A technical benefit may include to facilitate production and reduce the cost of the lubricant guide, and thereby of the lubrication arrangement comprising the lubricant guide.

Optionally in some examples, including in at least one preferred example, the lubricant guide may comprise at least one peripheral protrusion; and the housing may comprise at least one recess, configured to receive the peripheral protrusion of the lubricant guide, to restrict movement of the lubricant guide in relation to the housing. A technical benefit may include to maintain the lubricant guide in a fixed position in relation to the rotating shaft, so that it can be ensured that the lubricant can flow along the lubricant guide along a predictable path determined by the force of gravity acting on the lubricant.

Optionally in some examples, including in at least one preferred example, the lubricant guide may comprise openings. A technical benefit may include to allow axial passage of moving parts through the openings of the lubricant guide, which may be particularly beneficial when the lubrication arrangement is included in a braking system, such as a countershaft brake.

Optionally in some examples, including in at least one preferred example, the lubricant arrangement of the disclosure may be comprised in a transmission system of a vehicle, further comprising a shaft having an axial bore, and being configured to rotate in a rotational direction around a rotational axis, and the lubrication arrangement may be arranged and configured to guide lubricant into the axial bore of the shaft.

Optionally in some examples, including in at least one preferred example, the transmission system may be comprised in a vehicle.

Optionally in some examples, including in at least one preferred example, a lubrication arrangement according to the present disclosure in which the lubricant guide has openings may be included in a braking arrangement, controllable to brake a shaft of a transmission system, further comprising: at least one first braking member rotationally coupled to the shaft; at least one second braking member rotationally coupled to the housing; a brake piston inside the cup-shaped housing between the axially directed inner surface of the housing and end of the shaft, the brake piston comprising a plurality of protrusions extending through the openings of the lubricant guide to axially press the first braking member and the second braking member towards each other when the brake piston is actuated to move axially from the axially directed inner surface of the cup-shaped housing. A technical benefit may include to provide improved lubrication of lubrication sites along the hollow shaft that is braked by the braking arrangement.

Optionally in some examples, including in at least one preferred example, the braking arrangement may comprise an actuation chamber between the axially directed inner surface of the housing and an axially directed surface of the brake piston facing the axially directed inner surface of the housing.

Optionally in some examples, including in at least one preferred example, the braking arrangement may comprise a spring arranged between the lubricant guide and the brake piston for urging the brake piston axially away from the end of the shaft. A technical benefit may include that the lubricant guide can perform the dual functionality of acting as a spring support, defining an axially fixed end of the brake spring, and guiding the lubricant as described further above.

Optionally in some examples, including in at least one preferred example, the braking arrangement may comprise a radially directed lubrication channel connecting the bore to a periphery of shaft. A technical benefit may include that lubricant that has been diverted into the axial bore of the shaft can follow the axial bore and then the radially directed lubrication channel to a lubrication site at the periphery of the shaft.

Optionally in some examples, including in at least one preferred example, the braking arrangement may comprise at least one needle bearing mounted on the shaft to receive lubricant through the radially directed lubrication channel.

Optionally in some examples, including in at least one preferred example, the braking arrangement of the disclosure may be comprised in a transmission system of a vehicle, further comprising a shaft having an axial bore, and being configured to rotate in a rotational direction around a rotational axis, and the braking arrangement may be arranged and configured to guide lubricant into the axial bore of the shaft, and to brake the shaft.

Optionally in some examples, including in at least one preferred example, the transmission system may be comprised in a vehicle.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
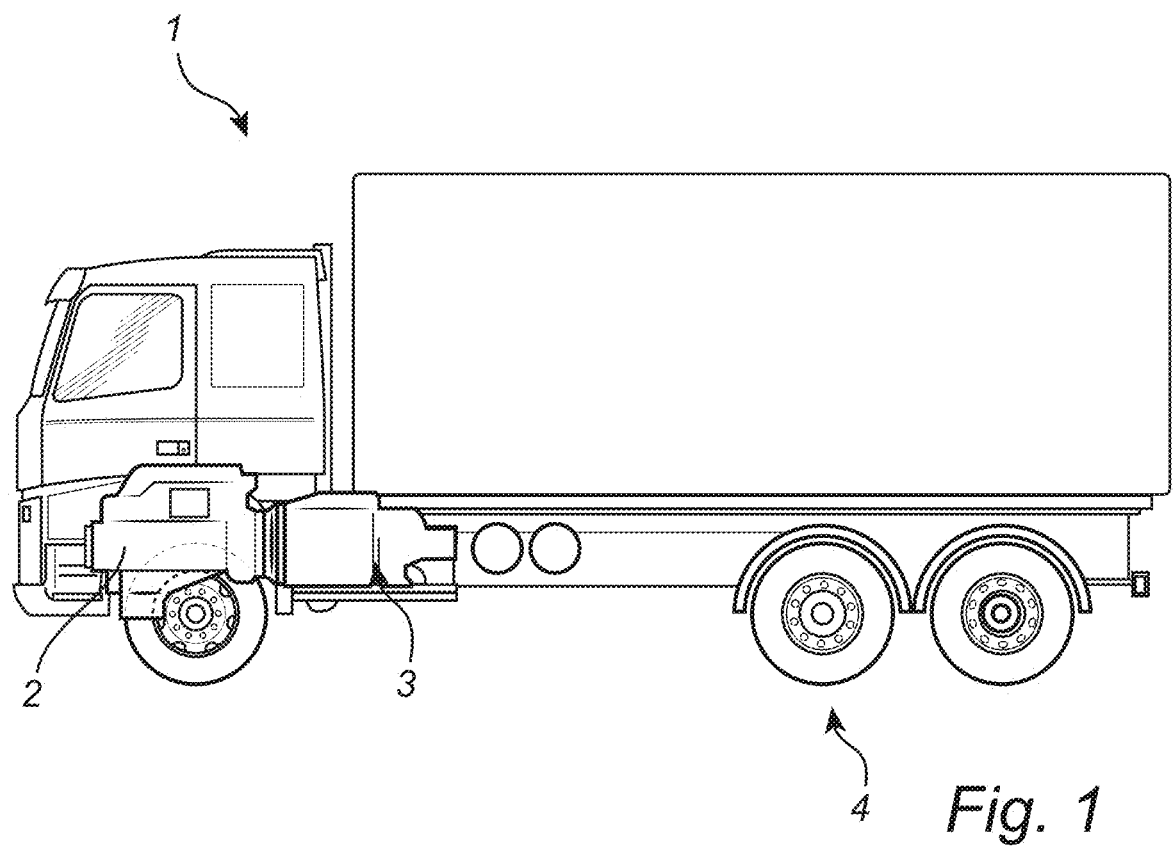
FIG. 1 is an exemplary vehicle according to an example.

FIG. 1 is an exemplary vehicle 1 according to an example, comprising a transmission system 3 for transmitting torque from the engine 2 to driving wheels 4 of the vehicle 1.

Figure 2:
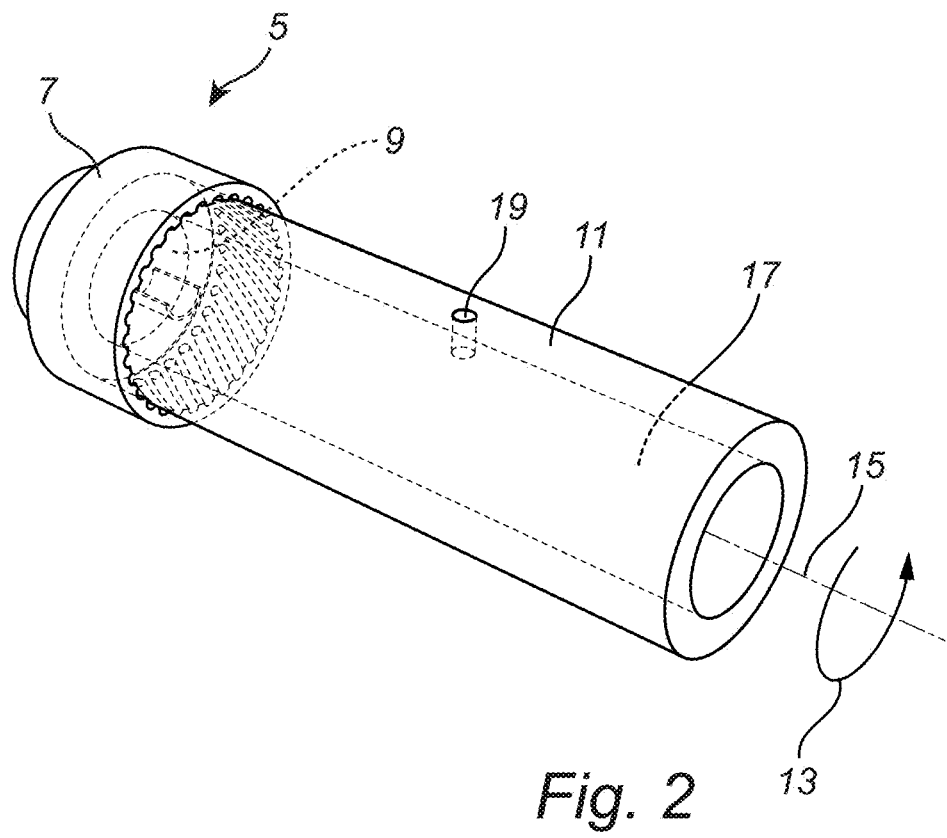
FIG. 2 is an exemplary lubrication arrangement according to an example.

Referring to FIG. 2, the transmission system 3 may comprise at least one shaft 11 with an axial bore 17 for allowing lubrication through the axial bore of at least one lubrication site along the shaft 11. When the hollow shaft 11 is rotating, as is schematically indicated in FIG. 2, lubricant provided at a periphery of the shaft 11 tends to be thrown away from the shaft 11 due to the rotation, and it has proven to be challenging to cause the lubricant to instead travel towards the rotational axis 15, so that the lubricant can enter the axial bore 17.

With continued reference to FIG. 2, a lubrication arrangement 5 is therefore provided for directing lubricant into the axial bore 17 of the shaft 11 rotating in a rotational direction 13 around the rotational axis 15 in the transmission system 3 of the vehicle 1. The lubrication arrangement 5 comprises a cup-shaped housing 7, and a lubricant guide 9. The shaft 11, which is not included in the lubrication arrangement 5 according to the present disclosure, is here schematically indicated as having a radially directed lubrication channel 19 connecting the axial bore 17 to a periphery of shaft 11, to allow supply of lubricant from the axial bore 17 to a lubrication site at the periphery of the shaft 11.

Figure 3:
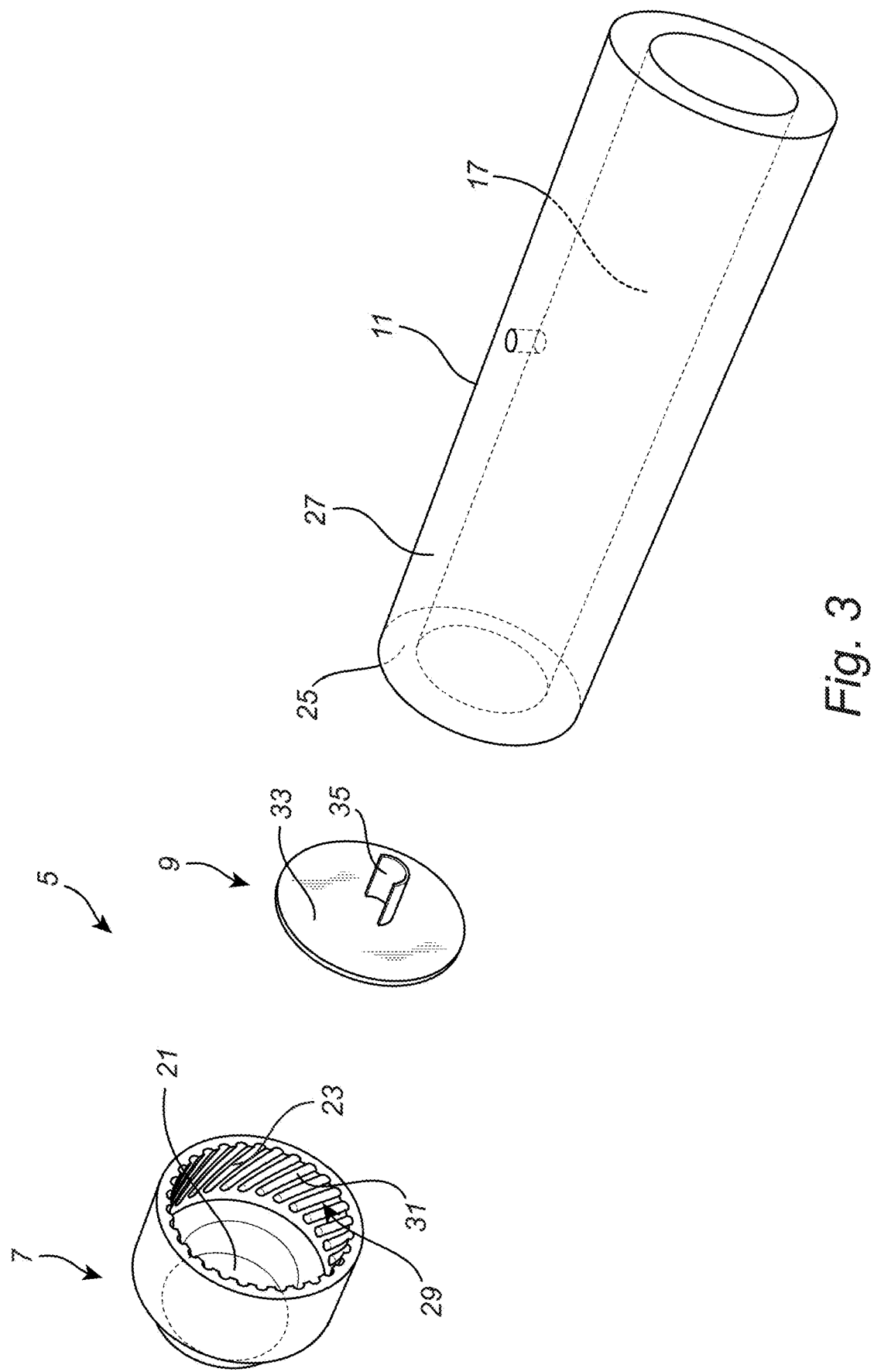
FIG. 3 is an exploded view of the exemplary lubrication arrangement in FIG. 2.

Reference will now be made to FIG. 3, which is an exploded view of the exemplary lubrication arrangement in FIG. 2. FIG. 3 schematically shows examples of the cup-shaped housing 7, the lubricant guide 9, and the shaft 11, which is not part of the lubrication arrangement 5. As is indicated in FIG. 3, the cup-shaped housing 7 has an axially directed inner surface 21 facing an end 25 of the shaft 11, and a radially directed inner surface 23 facing a radially directed outer surface 27 of the shaft 11. The lubricant guide 9 is arranged between the axially directed inner surface 21 of the housing 7 and the end 25 of the shaft 11 and is configured to guide lubricant impinging on the lubricant guide 9 into the axial bore 17 at the end 25 of the shaft 11. The radially directed inner surface 23 of the housing 7 has a flow redirecting structure 29 configured to guide lubricant impinging in a radial direction on the flow redirecting structure 29 axially towards the lubricant guide 9.

In the example configuration of the lubrication arrangement 5 schematically shown in FIG. 3, the flow redirecting structure 29 comprises at least one fluid guiding structure 31 extending in a direction having a component in the rotational direction 13 (see FIG. 2) of the shaft 11 and an axially directed component. In the particular example configuration shown in FIG. 3, the flow redirecting structure 29 is indicated as comprising a plurality of substantially parallel fluid guiding structures 31, which are substantially evenly distributed across at least a portion of the radially directed inner surface 23 of the housing 7. In FIG. 3, the fluid guiding structures 31 are indicated as being grooves/ridges for efficiently capturing and transporting lubricant drops being thrown off from the periphery 27 of the shaft 11, when the shaft rotates in the rotation direction 13 indicated in FIG. 2. The lubricant thus transported axially towards the axially directed inner surface 21 of the cup-shaped housing 7 impinges on the axially directed lubricant-receiving surface 33 of the lubricant guide 9, facing the end 25 of the shaft 11, and then moves under the influence of gravity to the at least one redirecting structure 35 extending into the axial bore 17 of the shaft 11. In FIG. 3, an exemplary redirecting structure 35 is schematically illustrated as a half pipe structure. It should be noted that this is only an illustrative example, and that the redirecting structure 35 may be configured in various different ways. One example of an alternative configuration will be discussed further below, with reference to FIG. 7.

Figure 4:
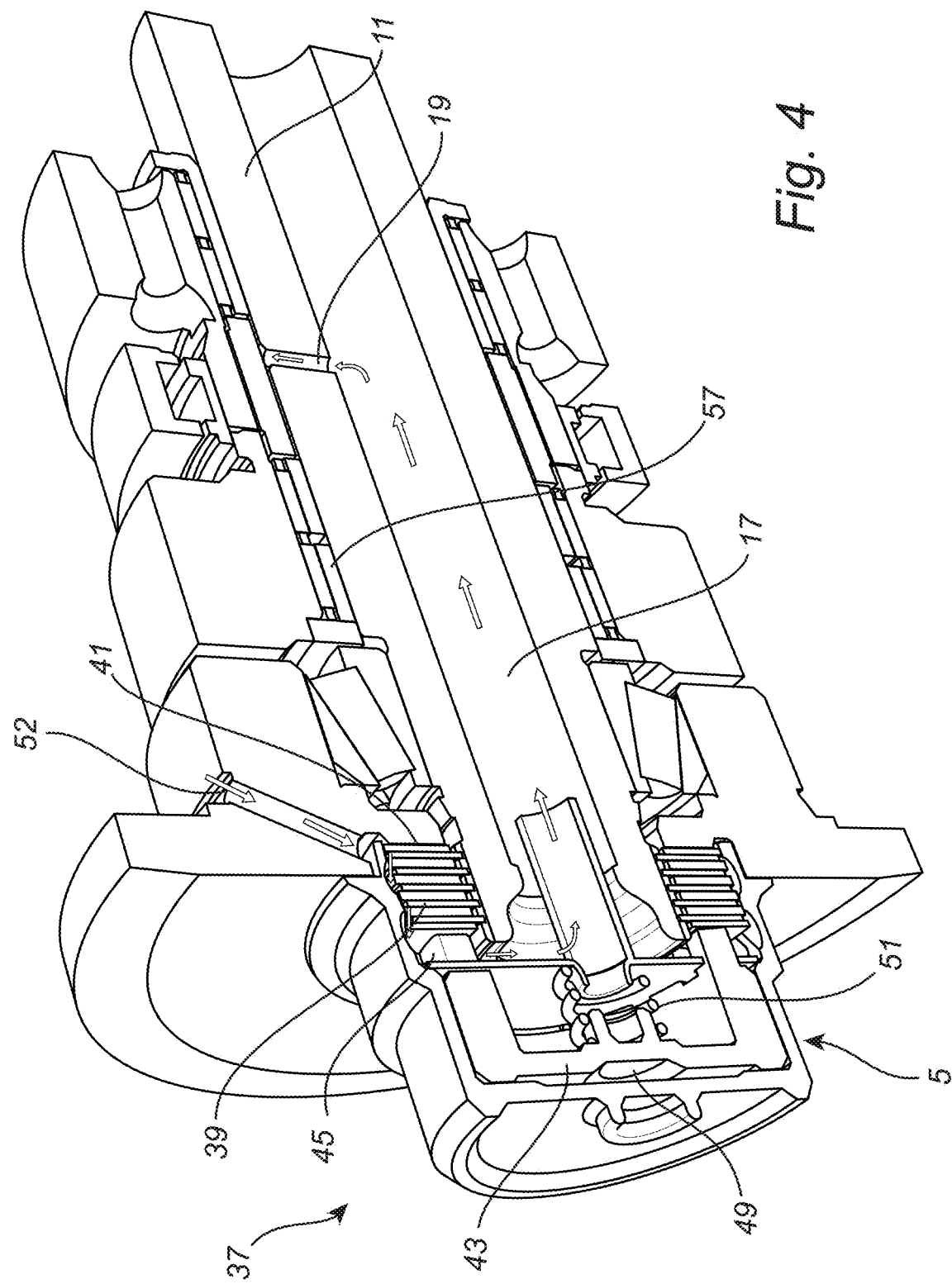
FIG. 4 is an exemplary braking arrangement according to an example.
Figure 6:
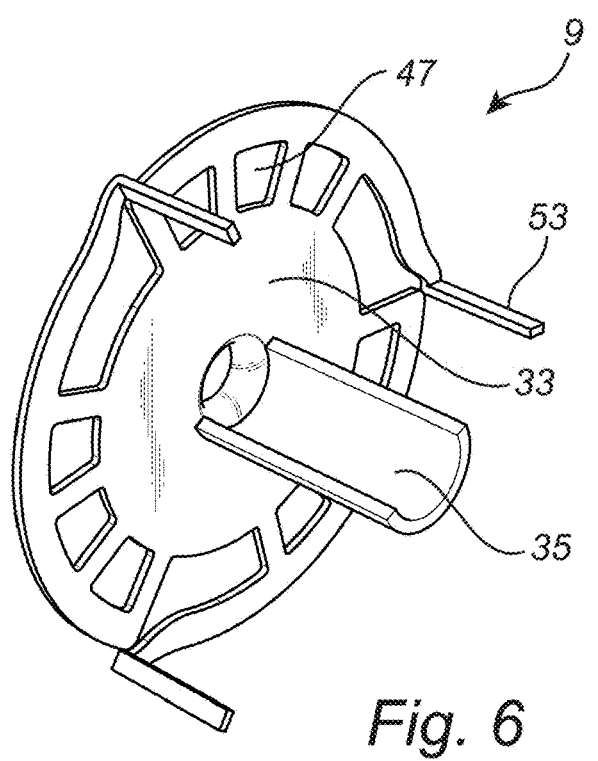
FIG. 6 is an exemplary lubricant guide comprised in an exemplary lubrication arrangement according to an example.
Figure 7:
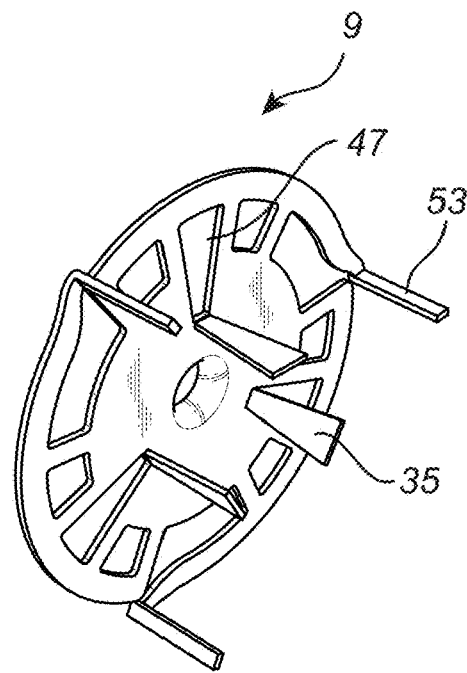
FIG. 7 is an exemplary lubricant guide comprised in an exemplary lubrication arrangement according to an example.

FIG. 4 is an exemplary braking arrangement 37 according to an example. The braking arrangement 37 may be configured for braking a countershaft 11 in a transmission system 3. Referring to FIG. 4, the braking arrangement 37 comprises at least a first braking member 39, at least a second braking member 41, a lubrication arrangement 5, and a brake piston 43. The at least one first braking member 39 is (in the configuration of FIG. 4 there are several first braking members 39) rotationally coupled to the shaft 11. The at least one second braking member 41 is rotationally coupled to the housing 7. In the configuration of FIG. 4, the first braking members 39 and the second braking members 41 are sandwiched in a layered configuration between rotationally stationary parts of the braking arrangement. In the configuration of FIG. 4, the lubricant guide 9 is provided with openings 47, which are best seen in FIG. 6 and FIG. 7. The brake piston 43 is disposed inside the cup-shaped housing 7 of the lubrication arrangement 5, between the axially directed inner surface 21 of the housing 7 and the end 25 of the shaft 11. The brake piston 43 comprises a plurality of protrusions 45 extending through the openings 47 of the lubricant guide 9 to axially press the first braking member 39 and the second braking member 41 towards each other when the brake piston 43 is actuated to move axially away from the axially directed inner surface 21 of the cup-shaped housing 7. To actuate the brake piston 43, the braking arrangement 37 comprises an actuation chamber 49 between the axially directed inner surface 21 of the housing 7 and an axially directed surface of the brake piston 43 facing the axially directed inner surface 21 of the housing 7. By introduction of fluid (such as air) in the actuation chamber 49, the brake piston 43 can be actuated. The braking arrangement 37 in FIG. 4 further comprises a spring 51 arranged between the lubricant guide 9 and the brake piston 43 for urging the brake piston 43 axially away from the end 25 of the shaft 11.

When the braking arrangement 37 is in operation, lubricant (indicated by block arrows in FIG. 4) is provided through a lubrication channel 52 and flows down towards the first 39 and second 41 braking members. Due to the rotation of the first braking member 39 and the shaft 11, the lubricant is thrown towards the radially directed inner surface 23 of the cup-shaped housing 7 (best seen in FIG. 5). As was explained further above, the lubricant is guided axially towards the lubricant guide 9 by the flow redirecting structure 29 (comprising grooves/ridges 31). Referring additionally to FIG. 6 and FIG. 7, when the lubricant hits the axially directed lubricant-receiving surface 33 of the lubricant guide 9, the lubricant flows downwards towards the redirecting structure 35, which extends into the axial bore 17 of the hollow shaft 11. To allow supply of the lubricant to, for example, a needle bearing 57 mounted on the shaft 11, the shaft is provided with at least one radially directed lubrication channel 19.

Figure 5:
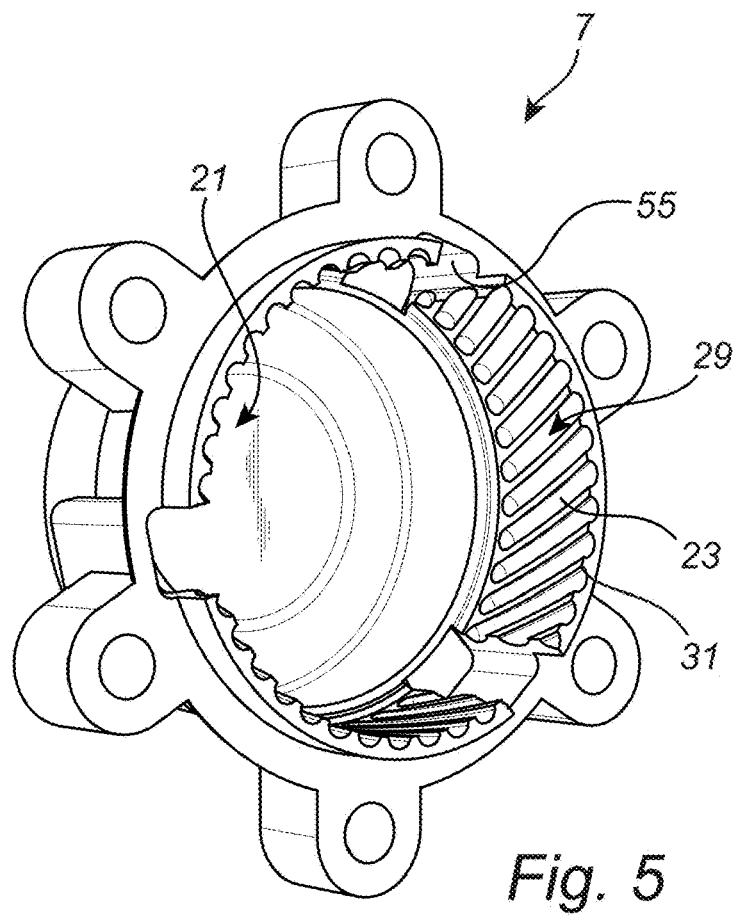
FIG. 5 is an exemplary cup-shaped housing comprised in an exemplary lubrication arrangement according to an example.

An example of the cup-shaped housing 7 and two different examples of the lubricant guide 9 will now be described with reference to FIG. 5, FIG. 6, and FIG. 7. In addition to the description of the cup-shaped housing 7 provided so far, the cup-shaped housing 7 in FIG. 5 comprises at least one recess 55, in this exemplary configuration three recesses 55 angularly evenly spaced apart. In addition to the description of the lubricant guide 9 provided so far, the lubricant guide 9 in FIG. 6 and FIG. 7 comprises at least one peripheral protrusion 53, in these exemplary configurations three peripheral protrusions 53 angularly evenly spaced apart. The recesses 55 of the cup-shaped housing 7 are configured to receive the peripheral protrusions 53 of the lubricant guide 9, to restrict movement of the lubricant guide 9 in relation to the housing 7. in particular to prevent rotation of the lubricant guide 9 in relation to the housing 7. In FIG. 6, the redirecting structure 35 extending into the axial bore 17 of the shaft 11 is indicated by the semicylindrical shape already introduced with reference to FIG. 3. In FIG. 7, the redirecting structure 35 extending into the axial bore 17 of the shaft 11 is indicated as being formed by a partly cut out and bent portion of the lubricant guide 9.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A lubrication arrangement for directing lubricant into an axial bore of a shaft rotating in a rotational direction around a rotational axis in a transmission system of a vehicle, the lubrication arrangement comprising:
   a cup-shaped housing having an axially directed inner surface facing an end of the shaft and a radially directed inner surface facing a radially directed outer surface of the shaft; and
   a lubricant guide arranged between the axially directed inner surface of the housing and the end of the shaft and configured to guide lubricant impinging on the lubricant guide into the axial bore at the end of the shaft,
   the radially directed inner surface of the housing having a flow redirecting structure configured to guide lubricant impinging in a radial direction on the flow redirecting structure axially towards the lubricant guide, the flow redirecting structure comprising at least one fluid guiding structure extending in a direction having a component in the rotational direction of the shaft and an axially directed component.

2. The lubrication arrangement as claimed in claim 1, the flow redirecting structure comprising a plurality of substantially parallel fluid guiding structures.

3. The lubrication arrangement as claimed in claim 2, wherein the fluid guiding structures are substantially evenly distributed across at least a portion of the radially directed inner surface of the housing.

4. The lubrication arrangement as claimed in claim 1, the lubricant guide comprising an axially directed lubricant-receiving surface facing the end of the shaft and at least one redirecting structure extending into the axial bore of the shaft.

5. The lubrication arrangement as claimed in claim 4, the least one redirecting structure being formed by a partly cut out and bent portion of the lubricant guide.

6. The lubrication arrangement as claimed in claim 1,
   the lubricant guide comprising at least one peripheral protrusion; and
   the housing comprising at least one recess, configured to receive the peripheral protrusion of the lubricant guide, to restrict movement of the lubricant guide in relation to the housing.

7. The lubrication arrangement as claimed in claim 1, the lubricant guide comprising openings.

8. A vehicle comprising the transmission system as claimed in claim 7.

9. A braking arrangement, controllable to brake a shaft of a transmission system, comprising:
   at least one first braking member rotationally coupled to the shaft;
   at least one second braking member rotationally coupled to the housing;
   the lubrication arrangement as claimed in claim 7; and
   a brake piston inside the cup-shaped housing between the axially directed inner surface of the housing and the end of the shaft, the brake piston comprising a plurality of protrusions extending through the openings of the lubricant guide to axially press the first braking member and the second braking member towards each other when the brake piston is actuated to move axially from the axially directed inner surface of the cup-shaped housing.

10. The braking arrangement as claimed in claim 9, comprising an actuation chamber between the axially directed inner surface of the housing and an axially directed surface of the brake piston facing the axially directed inner surface of the housing.

11. The braking arrangement as claimed in claim 9, comprising a spring arranged between the lubricant guide and the brake piston for urging the brake piston axially away from the end of the shaft.

12. A transmission system of a vehicle comprising:
   a shaft having an axial bore, and being configured to rotate in a rotational direction around a rotational axis; and
   the braking arrangement as claimed in claim 11, arranged and configured to guide lubricant into the axial bore of the shaft, and to brake the shaft.

13. A vehicle comprising the transmission system as claimed in claim 12.

14. A transmission system of a vehicle comprising:
   a shaft having an axial bore, and being configured to rotate in a rotational direction around a rotational axis; and
   the lubrication arrangement as claimed in claim 1, arranged and configured to guide lubricant into the axial bore of the shaft.

* * * * *